United States Patent
Anderson et al.

(10) Patent No.: US 9,286,339 B2
(45) Date of Patent: Mar. 15, 2016

(54) DYNAMIC PARTITIONING OF A DATA STRUCTURE

(75) Inventors: Eric A Anderson, Mountain View, CA (US); Joseph A Tucek, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 361 days.

(21) Appl. No.: 13/460,808

(22) Filed: Apr. 30, 2012

(65) Prior Publication Data

US 2013/0290375 A1    Oct. 31, 2013

(51) Int. Cl.
*G06F 17/30* (2006.01)

(52) U.S. Cl.
CPC .... *G06F 17/30327* (2013.01); *G06F 17/30362* (2013.01)

(58) Field of Classification Search
CPC ............... G06F 17/30327; G06F 17/30362
USPC ........................................................ 707/797
See application file for complete search history.

(56) References Cited

U.S. PATENT DOCUMENTS

| | | | | |
|---|---|---|---|---|
| 5,276,872 | A * | 1/1994 | Lomet et al. ............... | 1/1 |
| 5,430,869 | A * | 7/1995 | Ishak et al. ............... | 1/1 |
| 5,644,763 | A * | 7/1997 | Roy ............................ | 1/1 |
| 8,909,677 | B1 * | 12/2014 | Aguilera et al. .............. | 707/797 |
| 2003/0033328 | A1 * | 2/2003 | Cha et al. .................... | 707/204 |
| 2006/0282481 | A1 * | 12/2006 | Zhou et al. ................... | 707/204 |
| 2007/0233720 | A1 * | 10/2007 | Bae et al. .................... | 707/101 |
| 2009/0271408 | A1 * | 10/2009 | Graefe ........................ | 707/8 |
| 2012/0030370 | A1 * | 2/2012 | Faraj et al. .................. | 709/234 |

OTHER PUBLICATIONS

Graefe, G. "Partitioned B-trees—a user's guide," pp. 1-4, Microsoft Corporation, Redmond, VA 98052-6399, http://doesen0.informatik.uni-leipzig.de/proceedings/paper/IP11.pdf.
Graefe, G. "Sorting and indexing with Partitioned B-Trees," pp. 1-13, Proceedings of the 2003 CIDR Conference, Microsoft Corporation, Redmond, VA 98052-6399, https://database.cs.wisc.edu/cidr/cidr2003/program/p1.pdf.
Graefe, G. "Partitioned B-trees—a user's guide," pp. 1-4, Microsoft Corporation, Retrieved Sep. 21, 2015, Redmond, VA 98052-6399, http://doesen0.informatik.uni-leipzig.de/proceedings/paper/IP11.pdf.

* cited by examiner

*Primary Examiner* — Jensen Hu
(74) *Attorney, Agent, or Firm* — Dickinson Wright

(57) ABSTRACT

A method for dynamically partitioning a B-tree data structure, includes: determining if the B-tree data structure requires a partition; establishing a midpoint of the B-tree data structure; migrating from a beginning of the B-tree data structure to the midpoint of the B-tree data structure to a first B-tree data structure; migrating from the midpoint of the B-tree data structure to an end of the B-tree data structure to a second B-tree data structure; and allowing normal operations on the B-tree data structure during migration.

5 Claims, 5 Drawing Sheets

DYNAMIC PARTITIONING OF A DATA STRUCTURE

BACKGROUND

A file system or database to store large amounts of data may incorporate a data structure provided to organize data for various usages, such as symbolic links, databases, file systems and the like. One such data structure is a B-tree. The B-tree may be optimized for systems that read and write large blocks of data.

As used herein, "B-tree" also means B+tree, B*tree, Foster B-trees, dancing trees, and other balanced tree data structures that maintain strict height balance and with node sizes above two which vary between a set maximum and minimum of half the max or greater in the B-tree's persistent form.

According to various uses and implementations of a B-tree, a size of a B-tree may become larger than optimal. A large B-tree may present issues such as exceeding available storage space, or making operations and searches on a B-tree burdensome and timely. Further, operating and searching a smaller B-tree may provide a faster and convenient experience for a user of a file system that integrates a B-tree data structure. In addition, backing up, taking snapshots of, or relocating a B-tree can become difficult if the size is too large.

Thus, in cases where a B-tree has exceeded a threshold size, the file system may partition the B-tree into multiple B-trees. This partition usually is done in a static fashion. In one such implementation, several servers or locations are already provided. Thus, data starting with a value 'a' may go to server 1, while data starting with a value 'b' may go to server 2, and so on. This implementation is hindered by the inability to deal with imbalanced data sets. For example, if the data or pointers to be stored are URL information, the server dedicated to the data set starting with "w" fills up quicker than the other servers.

In another implementation, the B-tree may be implemented with internal pointers for each node, and internal pointers may facilitate reorganization. However, this implementation is invasive to the data structure and complicated to design and implement.

DESCRIPTION OF THE DRAWINGS

The detailed description will refer to the following drawings in which like numerals refer to like items, and in which.

DETAILED DESCRIPTION

In a file system that utilizes data storage, such as in a B-tree format, if a B-tree exceeds a certain size, or the system determines that a B-tree partition is advantageous, the B-tree may be partitioned.

A partitioned B-tree offers several advantages, such as being traversable and searchable in a shorter period of time (versus a non-partitioned B-tree), and allowing multiple storage devices or databases to share the burden of data storage. Further, several different B-tree structures may be stored on multiple servers. If a B-tree size reaches a threshold, a partition of the B-tree may be requested or instigated.

Further, the aspects according to partitioning a B-tree disclosed herein may also be implemented along with the merging of multiple B-trees.

The threshold may be a set by a user based on a desired B-tree size or set based on data storage capabilities. The threshold also may be a soft limit. A soft limit (or bound) is a limit that indicates a partitioning should occur, but is not mandatory. A soft limit provides for discretionary partitioning, thereby not forcing a system to partition a B-tree if a limit is reached. In this instance, a user or system may determine to partition a B-tree at a later time, for example, when system resources are available.

Disclosed herein are several examples of dynamically partitioning a data structure, such as a B-tree structure. In the examples provided below, a system in which the B-tree structure is implemented on remains operational. Thus, various operations, such as insertions, deletions and updates to nodes may still occur while the B-tree is being partitioned. In a static partition of a B-tree, the whole B-tree is locked. However, in the dynamic partitioning disclosed herein, the B-tree is operational.

Further, in the examples disclosed herein, if during the partitioning of a B-tree, an error or failure is detected, a cleanup deletes the temporary B-tree being created and reverts to the B-tree prior to the partition.

Figure 1:
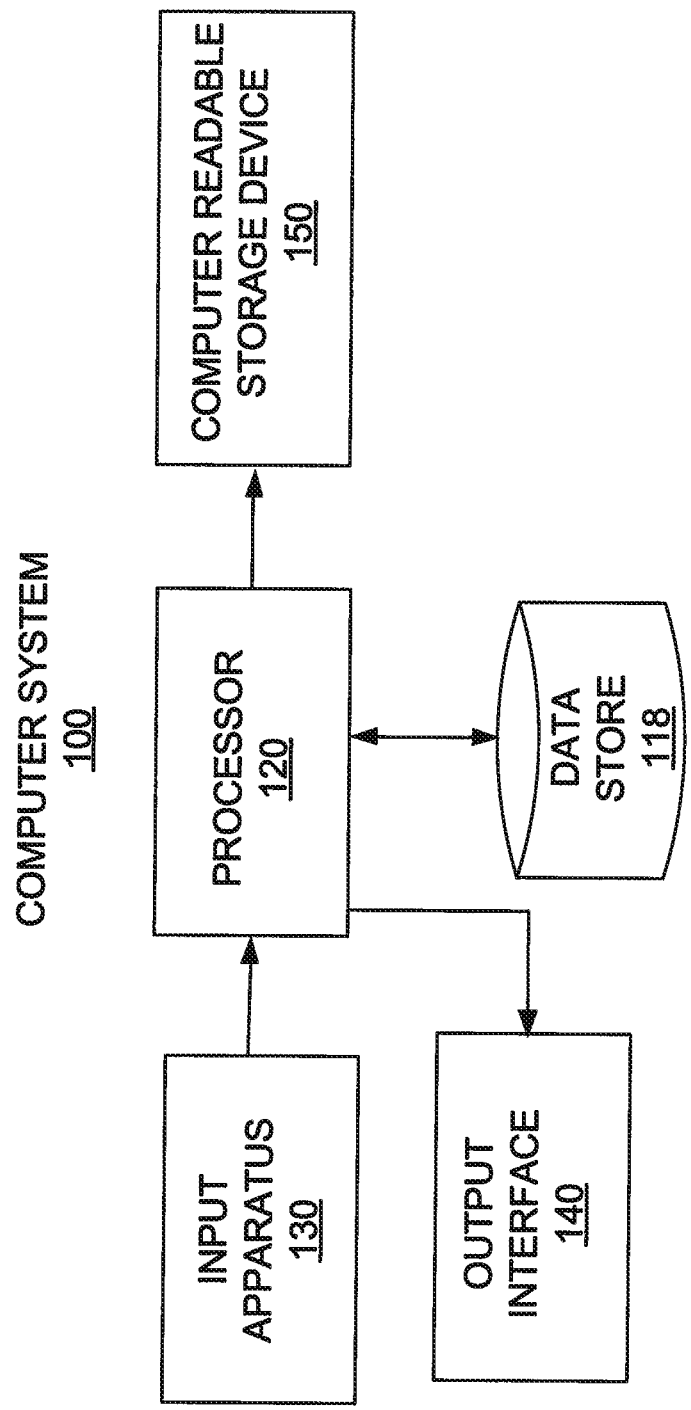
FIG. 1 illustrates a block diagram of an embodiment of a computer system.

FIG. 1 illustrates a simplified block diagram of an embodiment of a computer system. In FIG. 1, computer system 100 includes a processor 120, an input apparatus 130, an output interface 140, and a data store 118. The processor 120 implements and/or executes the computer system 100. The computer system 100 may include a computing device, may include an integrated and/or add-on hardware component of the computing device. Further, a computer readable storage medium 150 that stores instructions and functions for the processor 120 to execute also may be provided.

The processor 120 receives an input from an input apparatus 130. The input apparatus 130 may include, for instance, a user interface through which a user may, access data, such as, objects, software, and applications that are stored in the data store 118. In addition, or alternatively, a user may interface with the input apparatus 130 to supply data into and/or update, previously stored data in the data store 118. The input apparatus 130 may include a user interface through which a user may access versions of the data stored in the data store 118, as outputted through the output interface 140. The computer system 100 includes a B-tree data structure.

Figure 2:
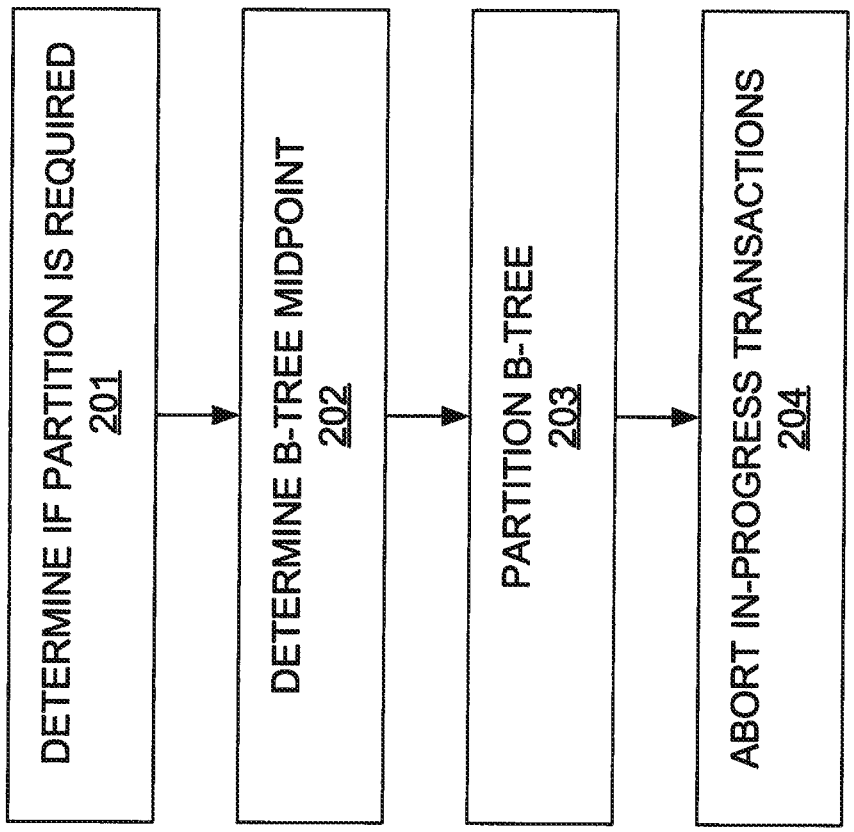
FIG. 2 illustrates a flowchart of a method for partitioning a B-tree data structure according to an embodiment.

FIG. 2 illustrates a flowchart of an example method for partitioning a B-tree data structure according to an embodiment. In method 200, before any normal operation (such as an insertion, deletion or update)—a read lock is taken. The normal operations correspond to modification to a B-tree data structure. Before a partition (or migration) a write lock is taken. In the method 200, the read and write locks may be performed globally.

At block 201, a determination is made as to whether a partition of a B-tree should occur. As stated above, various different metrics may be used for this determination, such as by user discretion, exceeding available storage space or the B-tree exceeding a soft limit.

At block 202, a midpoint of the B-tree is determined. If the B-tree supports it directly, the B-tree may be queried for the midpoint. If not, the usual iterator application program interface (API) supported by B-trees can be used to determine the midpoint. This may be done by establishing two iterators that traverse the B-tree. Alternatively, a midpoint may be established by calling into the B-tree for midpoint information, if supported. The first iterator traverses the B-tree at a specific pace, such as one entry at a time. The second iterator traverses the B-tree at double the pace of the first iterator. When the second iterator reaches a terminal point (or end of the B-tree) of the B-tree, the location of the first iterator at this time is established as the midpoint.

At block 203, after the midpoint is established, contents of the B-tree from the beginning of the B-tree to the midpoint are copied to a first partition, while contents of a B-tree from a midpoint to an end of the B-tree are copied to a second partition. During this partitioning (or migration) all normal operations are stopped by a write lock that is applied globally.

At block 204, after the partitioning is completed, the global write lock may be released. Additionally, a partition list is also updated based on the partitioning. Thus, normal operations may be performed on either the first new partition or the second new partition.

Figure 3:
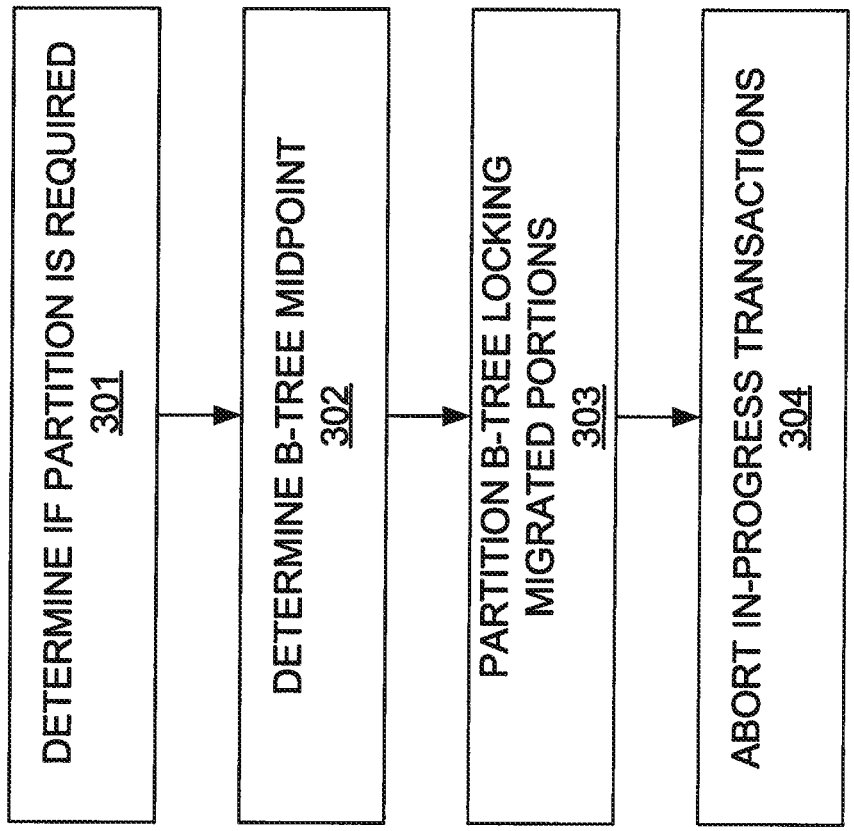
FIG. 3 illustrates a flowchart of a method for partitioning a B-tree with an incremental range lock according to an embodiment.

FIG. 3 illustrates a flowchart of an example method for partitioning a B-tree with an incremental range lock according to an embodiment. In method 200, a global lock is retrieved, thereby preventing normal operations during the partitioning phase in method 300, an incremental range lock may be retrieved. An incremental range lock refers to a lock that locally locks a portion of a B-tree. Thus, in method 300, a write lock may be taken on the portions of the B-tree that have been partitioned (or migrated), while allowing normal operations on the remaining portions of the B-tree.

At blocks 301 and 302, a determination is made to partition the B-tree, and a midpoint is determined. This operation is similar to blocks 201 and 202.

At block 303, the B-tree undergoes partitioning. Once a portion of the B-tree is migrated to a new B-tree, the migrated portions of the B-tree are locked. The rationale for doing so is to prevent an errant updating of the B-tree, by creating multiple versions of one node.

Another modification, referring to the method disclosed in FIG. 3, is that a transaction ID is maintained anytime a modification to the B-tree is made. Thus, at block 304, and once the partitioning has finished, the in-progress transactions are aborted. Additional instructions or codes may be implemented so that the failed or canceled transactions are retrieved.

Figure 4:
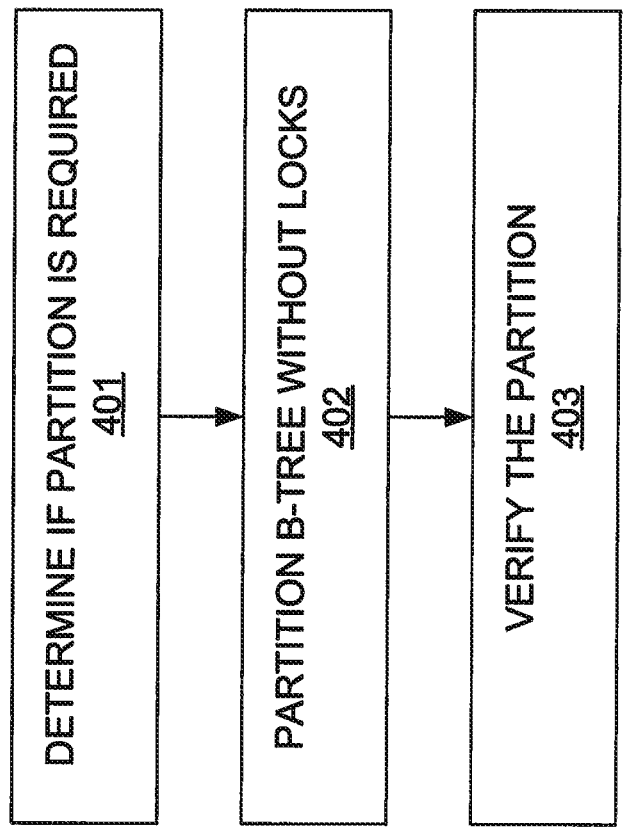
FIG. 4 illustrates a flowchart of a method for partitioning a B-tree with transactional information according to an embodiment.

FIG. 4 illustrates a flowchart of an example method for partitioning a B-tree with transactional information according to an embodiment.

At blocks 401, a determination is made to partition the B-tree. This operation is similar to block 201. At block 402, a partition is made, without the taking of any locks. By not taking any locks, interference with the non-partition operations is reduced. At block 403, verification is done to determine if the partition has been successful by determining if the newly created B-trees match the values of the source B-tree. A method similar to the methods used referring to FIGS. 2 and 3 may be employed for the verification. If the verification shows that any additional operations have to be performed, the new B-trees are updated based on the additional operations.

The verification operation at block 403 is partially based on the rationale that the resources and cost of reading two B-trees (if a cache is used for storing a record of recent operations performed on the original B-tree) is less than the resources of reading one, while writing to another.

At block 403, two techniques may be implemented to reduce the cost of the verification. While the B-tree is performing a partition (or migration), it is assumed that any normal operations (such as insertions, deletions and updates) are simultaneous stored in a cache. Thus, the cache may be read out and used to update the new B-tree based on the verification indicating that the old B-tree has been updated.

Alternatively, the nodes of the B-tree may include a time stamp. Thus, an inspection of the B-tree may indicate which nodes have been updated by determining if the time stamp occurs after the partitioning. Once the nodes that have been updated are determined, the new B-tree nodes corresponding to the updated nodes of the original B-tree may similarly be modified.

If the method for determining additional operations with a cache is used, and the cache becomes too large or is filled to capacity, a reversion back to the B-tree partitioning methods of FIGS. 2 and 3 may be made.

Referring to method 400, instead of performing the verification, all changes to the original B-tree may be stored in a cache. Once the B-tree is partitioned (such as at block 403), the cache can be incrementally read out until it is empty or very small. At this stage, either of methods 200 or 300 may be performed for the purposes of verification. Thus, by using this modification, the amount of time to perform the verification should be reduced from the method 400. Additionally, the modification may be improved upon by allowing a maximum number of updates or a total time limit to perform migration before defaulting back to the methods 200 and 300.

Alternatively, and depending on the system being implemented instead of storing the entries of the keys being updated (i.e. values), a system could store various keys associated with each update. Keys refer to an identification of a b-tree entry, while the value of a key refers to the contents associated with said key. By keeping track of keys (rather than values), superior performance may be realized. For example, if a preference is to perform an initial partition in a reduced consistency model, then all the transactions (including ones that abort) are tracked, in order to perform a recovery or update of keys and values. This tracking includes all outstanding transactions at the start of the migration, while the migrations may be postponed until all ongoing transactions are finished. In these cases, it may be preferred to keep track of keys rather than the value and the key.

Figure 5:
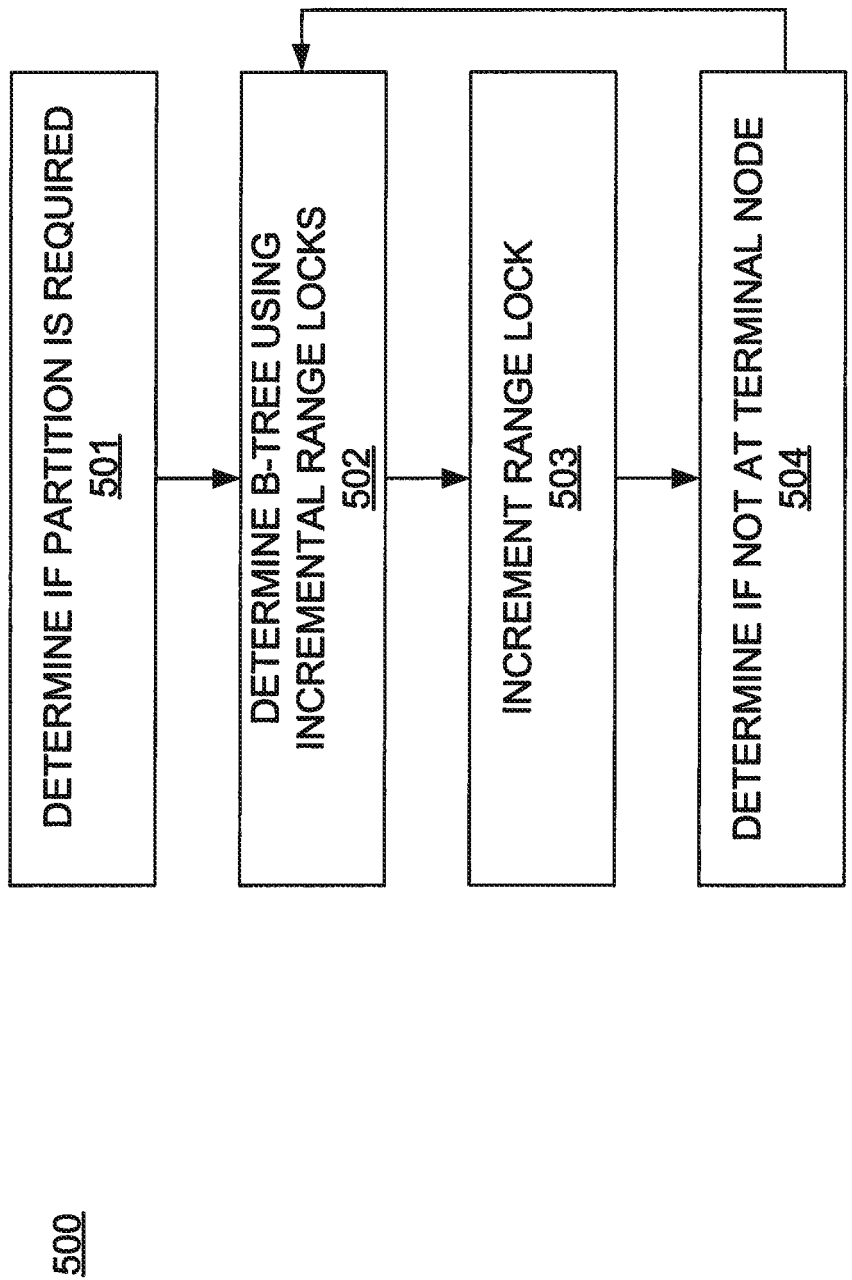
FIG. 5 illustrates a flowchart of a method for partitioning a B-tree with a range lock according to an embodiment.

FIG. 5 illustrates a flowchart of an example method for partitioning a B-tree with a range lock according to an embodiment. In method 500, at block 501, a determination is made similar to the determination of block 201.

At block 502, a partitioning of the B-tree commences. Thus, as various nodes of a B-tree are being migrated (i.e. as each node is copied to an appropriate new B-tree), a range lock is established on the portion being migrated. A range lock essentially serves as a localized write lock. The range lock locks not only the current node being migrated, as well as neighboring nodes, so that if an operation attempted on the current node is an insertion or deletion, the neighboring nodes may also be updated.

At block 503, the range lock is incremented to another node further down the B-tree. At block 504, a determination is made as to whether there are other nodes to be migrated, or if the migration is completed. If there are other nodes to be migrated, the method 500 returns to block 502. In this way, a B-tree is iteratively partitioned into new B-trees.

If an update occurs in any of blocks 502 to 504, a determination is made as to update the B-tree in one of three ways. First, a determination is made as to whether the B-tree portion being updated has already been migrated. In this situation, both the old B-tree and the new B-tree are updated. If the portion has not been migrated, only the old B-tree is updated. Alternatively, if the update occurs in a portion under a range lock, an implementation similar to the method 400 may be used.

In all the examples described above, if an error is detected, a simple cleanup may be performed by deleting the newly created B-tree and reverting to the original B-tree.

Further, in the examples provided above, different trade-offs are presented with each implementation. Thus, based on a system developer's requirements, such as speed or simplicity, various implementations and combinations thereof may be used.

We claim:

1. A method comprising:
 determining if a B-tree data structure requires a partition;
 migrating the B-tree data structure to a first B-tree data structure and a second B-tree data structure, wherein the migrating is performed without taking any locks;
 storing in a cache normal operations applied to the B-tree data structure during the migration;
 verifying the migration of the first B-tree data structure and the second B-tree data structure based on the B-tree data structure; and
 performing additional operations based on the verification, wherein the additional operations comprise updating the first B-tree data structure and the second B-tree data structure based on the cache.

2. The method according to claim 1, wherein the additional operations comprise updating the first B-tree data structure and the second B-tree data structure based on time stamps associated with the B-tree data structure.

3. The method according to claim 1, further comprising:
 bypassing the verifying the migration;
 storing in a cache operations applied to the B-tree data structure during the migration; and
 iteratively updating the first B-tree data structure and the second B-tree data structure with the cache until the cache is empty.

4. The method according to claim 3, further comprising storing in the cache keys associated with the operations applied to the B-tree data structure.

5. The method according to claim 3, further comprising:
 determining when the cache is below a reference threshold; and
 reverting to a second method for dynamically partitioning the B-tree data structure in response to the determination that the cache is below the reference threshold,
 wherein the second method write locks the B-tree data structure and migrates any updates to the cache to the first B-tree data structure or the second B-tree data structure.

\* \* \* \* \*